UNITED STATES PATENT OFFICE.

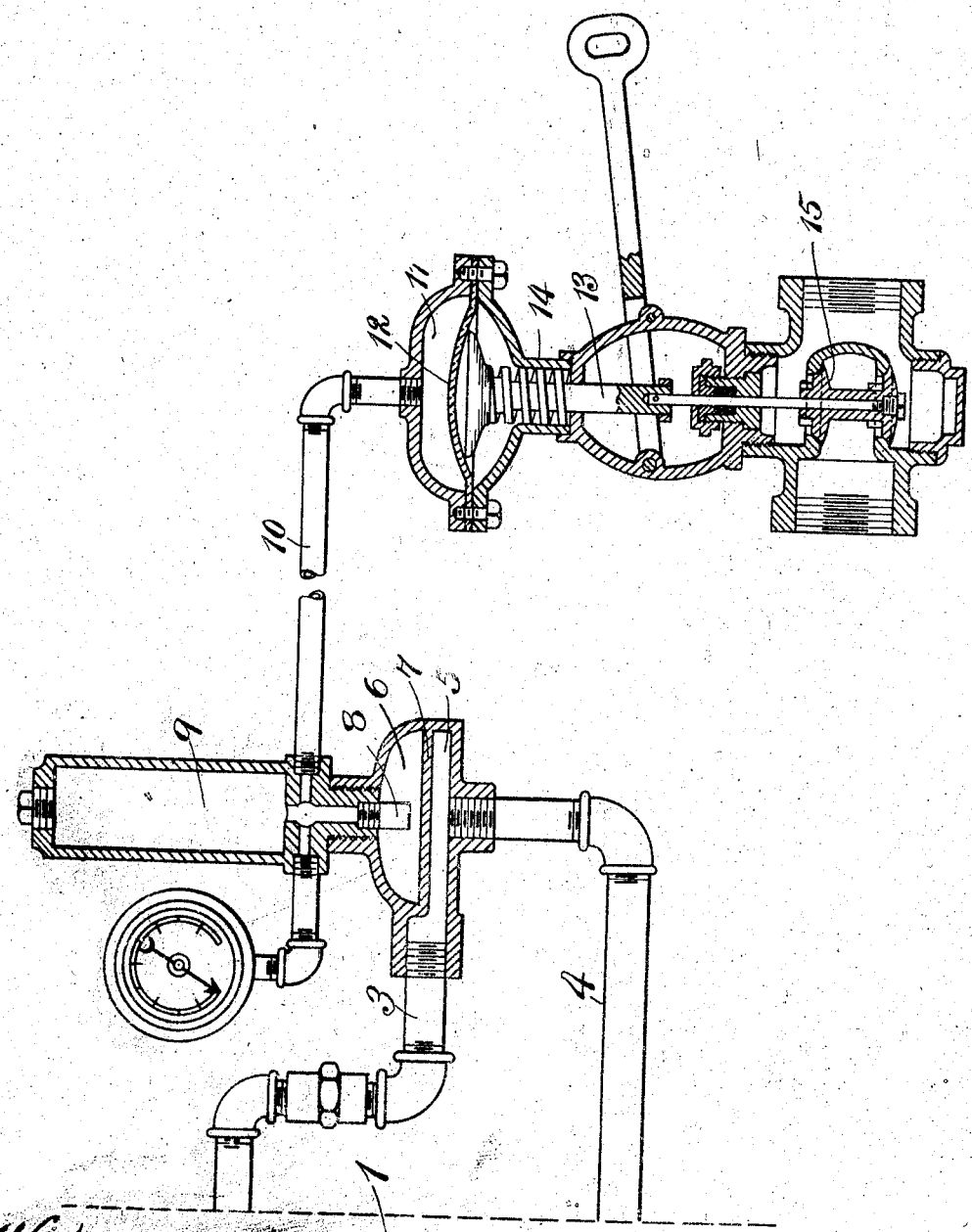

FRED H. PLOUFF, OF BOSTON, MASSACHUSETTS.

FEED-WATER REGULATOR.

No. 823,635. Specification of Letters Patent. Patented June 19, 1906.

Application filed January 11, 1904. Serial No. 188,525.

*To all whom it may concern:*

Be it known that I, FRED H. PLOUFF, of Boston, in the county of Suffolk and State of Massachusetts, have invented certain new and useful Improvements in Feed-Water Regulators, of which the following is a specification.

This invention relates to apparatus for automatically controlling the supply of feed-water to a steam-generator or similar receptacle, and more particularly to that class of such devices in which the boiler water and steam act alternately on a chamber containing a vaporizable liquid the pressure from which is transmitted to an expansible chamber which controls a suitable device for governing the supply of feed-water.

The object of the invention is to render the action of apparatus of this kind more quick, sure, and uniform.

The accompanying drawing represents a sectional view of a feed-water regulator constructed in accordance with my invention.

1 represents the boiler, having its steam and water spaces connected, respectively, by pipes 3 4 with a water and steam chamber 5, located at the average or normal water-line level of the boiler. The chamber 5 is formed in the lower part of a casing, in the upper part of which is a liquid-chamber 6, separated from the chamber 5 by a heat-conducting partition 7. A conduit 8 has its inlet-orifice in the lower part of chamber 6 and connects with an elevated reservoir and expansion-chamber 9 and also with a pipe 10, which extends to an expansible chamber 11. The lower wall of the latter is formed by a flexible diaphragm 12 acting on a vertically-movable stem 13 in opposition to a spring 14. The stem 13 is connected to a valve 15, which controls the feed-water supply to the boiler in some suitable manner—as, for instance, by being the throttle-valve to a steam-boiler pump—or it may control a by-pass to the boiler, in which case it would be so connected that upon its operation it would open the passage leading to the boiler. Any other well-known feed-water-controlling device may be actuated by the expansible chamber 11.

Any suitable vaporizable liquid, such as water or a liquid non-freezable at ordinary temperatures, fills the chamber 11, the pipe 10, the lower part of the chamber 9, the conduit 8, and the chamber 6 to a point above the inlet-orifice of conduit 8. Some air may be entrapped in the closed pocket formed by the upper part of the chamber 6. The upper part of the chamber 9 above the liquid contained therein is practically a vacuum at ordinary temperatures containing substantially only the vapor of the liquid used in the apparatus at a pressure much less than that of the outside atmosphere.

The vacuum is produced in the following manner: Water is introduced into the apparatus through the opening shown at the top of the chamber 9 until the liquid-chamber, the expansible chamber in the valve-controller, and the conduits are filled and the chamber 9 is partially filled. The opening is then closed by the plug (shown in the drawing) and the apparatus heated to a comparatively high temperature. This causes the air contained in the top of chamber 9 to be raised to a high pressure and also causes much of the air contained in the water and in the top of chamber 11 to be expelled and gathered in the top of chamber 9. When the pressure has become sufficiently high, the opening at the top of chamber 9 is opened a slight amount sufficient to allow the air to escape, and when all of the air has been forced out and the vapor of the liquid appears at the opening the latter is closed. This operation is performed as many times as may be necessary to cause the expulsion of practically all of the air contained in the apparatus except that in the upper part of the liquid-chamber 6 above the outlet from conduit 8. When the liquid is allowed to cool then to the ordinary temperature, the space above the liquid in chamber 9 is practically free from air and contains only a quantity of vapor at a pressure so much less than that of the atmosphere that it may for all practical purposes be regarded as and called a "vacuum." Usually the vacuum obtained is as nearly complete as is obtained in the condenser of a steam-engine.

As the water-level in the boiler fluctuates the boiler steam and water alternately fill the chamber 5. The presence of steam in said chamber at low water causes a partial vaporization of the liquid in chamber 6 overlying the partition 7, said steam giving up a portion of its latent heat to the liquid above partition 7. Because of the increase of pressure thereby caused through the expansion and vaporization of the water in chambers 6 and 9 the liquid in pipe 10 is forced into the chamber 11, causing the diaphragm 12 to depress stem 13 and open valve 15, thereby starting the pump in operation or allowing the feed-water to be forced into the boiler. As the water-level in the boiler rises water occupies the chamber 5 in place of steam and being incapable of adding enough heat to the liquid in chamber 6 and connections to make up for the loss of heat by radiation from the exposed surfaces a decrease takes place in the vapor-pressure above the surface of the liquid in said chambers 6 and 9. The liquid is thereby allowed to return to chambers 6 and 9 from the chamber 11, and the spring 14 is permitted to elevate the stem 13 and close the valve 15, thereby stopping the supply of feed-water.

The chamber 9, by reason of the vacuum-space in the upper part thereof, acts as an expansion-chamber to take care of the slight expansion of the liquid in conduit 10 and connections due to heating and as a reservoir-chamber to maintain a supply of liquid over the inlet-orifice of conduit 8. It also constitutes a condensing-chamber for the vapor, wherein, owing to its exposed position, which permits rapid radiation, and also on account of the low pressure therein, the vapor is quickly condensed when the water-level in the boiler has risen to such an extent as to fill the water and steam chamber with water. Devices of this character, in which the chamber 9 is absent and the pipe 10 forms an unbroken connection with the conduit 8, are defective in their action. One reason for this is that in order to obtain a quick vaporization of the liquid in chamber 6 as thin a layer as possible of liquid must be maintained over the partition 7; but when only a small body of liquid covers this partition there is not sufficient liquid in said chamber to effect the desired movements of the diaphragm 12 without uncovering the inlet of conduit 8. By providing the chamber 9 I am enabled to maintain a thin layer of liquid over the partition 7, while securing sufficient movement of the liquid to properly actuate the diaphragm 12. Another reason is that when the conduits and chambers are filled with liquid the cooling of the same after it has once been heated by the steam and been expanded is so slow and the contraction in consequence also so gradual that the valve 15 will not be closed quickly enough. When the chamber 9 is omitted or when it is completely filled with liquid and the valve 15 is closed, on steam being introduced into the chamber 5 the device acts readily enough, since the liquid is very quickly expanded and the valve at once opened, whereupon water is immediately supplied to the boiler; but the contraction is so slow that the valve remains open and water continues to be supplied until long after the proper level has been reached. Thus when operated in this manner the apparatus is not sufficiently sensitive for the purpose of controlling a boiler-feed, and in order to obtain the necessary sensitiveness it is absolutely essential that the vacuum-space previously described should be provided. By means of this space, as previously stated, the vapor is immediately condensed and the pressure in chamber 11 relieved, so that the valve 15 is almost immediately closed upon the water in the boiler rising above the level of chamber 7.

I do not wholly confine myself to the employment of a pocket in chamber 6 above the lower end of conduit 8, as the device will operate without such feature.

I claim—

1. In a feed-water regulator, a chamber containing a quantity of vaporizable liquid insufficient to fill the same and having an internal pressure at ordinary temperatures considerably lower than that of the atmosphere, a water and steam chamber in close, heat-transferring relation with the first chamber, and adapted to be connected with a boiler above and below the water-level thereof, and fluid-operated feed-controlling means connected with said first chamber.

2. In a feed-water regulator, the combination with the boiler, of a water and steam chamber connected with the water and steam spaces of the boiler, a vaporizing-surface of relatively large area formed on a wall of said chamber, a liquid-chamber including said surface, a conduit of relatively small aperture leading from said liquid-chamber for carrying a liquid to operate a feed-controller, and a vacuum-chamber containing a quantity of liquid and forming an overlying pocket in branch connection with the interior of said liquid-chamber and conduit.

3. In a feed-water regulator, a water and steam chamber, a liquid-chamber above the latter and in heat-transferring relation thereto, a conduit having an inlet in said liquid-chamber extending and having its outlet below the upper end thereof and adapted for connection with a feed-controller, and a vacuum reservoir-chamber above said liquid-chamber having a branch connection with the interior of the latter and of said conduit.

4. A feed-water regulator comprising a water and steam chamber connected with the water and steam spaces of a boiler, a water and air chamber above and in heat-transferring relation with the water and steam chamber, a vacuum-chamber above the water and air chamber, an expansible chamber, a conduit leading from the vacuum-chamber to the water and air chamber and opening below the top thereof, a second conduit leading from the vacuum-chamber to the expansible chamber, a body of water filling the expansible chamber, the conduits and the lower portions of the water and air and vacuum chambers, and feed-controlling means operable by said expansible chamber.

5. In a feed-water regulator, a water and steam chamber having communication with the water and steam spaces of a boiler, a liquid-chamber above the same and separated therefrom by a heat-transferring partition, a feed-controller comprising a valve and fluid-operated mechanism for actuating the same, a conduit connecting said controller and liquid-chamber, said liquid-chamber, conduit and a chamber in the feed-controller being filled with a vaporizable liquid, and a vacuum-chamber above said liquid-chamber in communication therewith and with the conduit, the said vacuum-chamber containing a quantity of liquid in its lower portion and at ordinary temperatures, a vacuum in its upper portion.

In testimony whereof I have affixed my signature in presence of two witnesses.

FRED H. PLOUFF.

Witnesses:
R. M. PIERSON,
A. C. RATIGAN.